July 24, 1956 F. J. FINEGAN 2,755,985
IRRIGATING APPARATUS
Filed Oct. 18, 1954
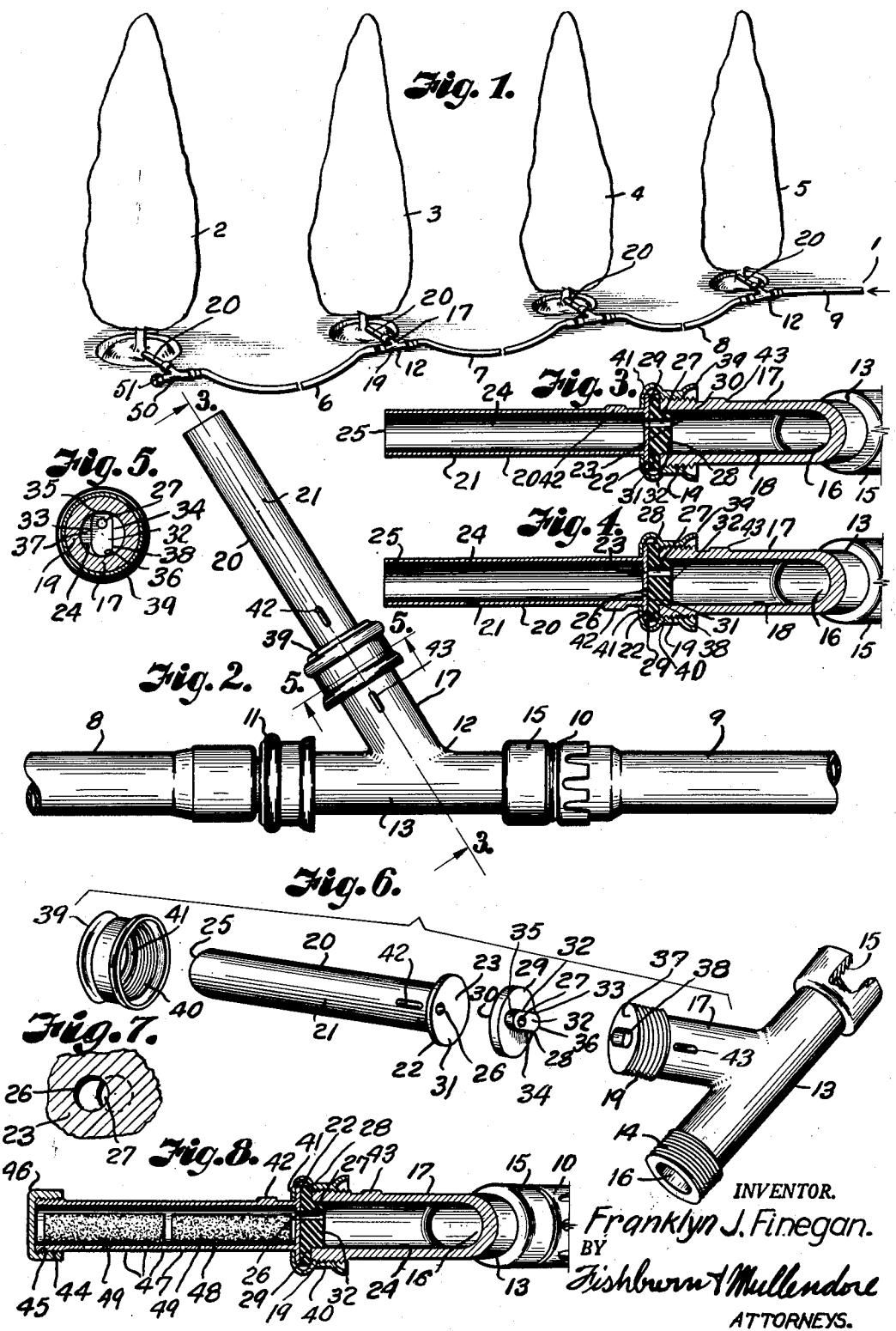
INVENTOR.
Franklyn J. Finegan.
BY
Fishburn & Mullendore
ATTORNEYS.

United States Patent Office 2,755,985
Patented July 24, 1956

2,755,985

IRRIGATING APPARATUS

Franklyn J. Finegan, Prairie Village, Kans.

Application October 18, 1954, Serial No. 462,664

3 Claims. (Cl. 299—83)

This invention relates to an apparatus for watering and/or fertilizing a plurality of shrubs, trees or the like simultaneously.

It is well known that newly planted shrubs and trees must be watered periodically with large amounts of water. Ordinarily the average homeowner has only a single hose and water connection available for such purposes. Consequently, the plantings must be watered one at a time, and where many plantings have been made, much time is consumed in such work. There is a tendency to shorten the time by increasing the flow of water in the attempt to complete the watering in a reasonable time. In most cases this procedure results in waste of water because the water runs off before it has an opportunity to soak into the soil. Also, the velocity of the flow tends to wash the soil from around the roots of the plants. Another difficulty is that unless entire attention is given to the watering, the homeowner becomes interested in many other duties and forgets the watering is in process with the result that the water runs off as soon as the soil around the plant is saturated. It is therefore the principal object of the present invention to provide a watering or irrigating apparatus that may be used to water a plurality of plantings simultaneously and wherewith the flow of water may be individually regulated to any one of the respective plantings thereby supplying the exact amount of water required and which is dependent upon the soil conditions, rate of saturation and size of the respective plantings.

Other objects of the invention are to provide an irrigating apparatus which includes a plurality of hose sections adapted to be connected together and by outlet fittings whereby the outlets are arranged according to the spacing between the plantings; and to provide outlet fittings of simple and inexpensive construction so that they may be sold at relatively low cost.

Further objects of the invention are to provide outlet fittings having simple control mechanisms for supplying the water at each respective plant in conformity with the required flow rate depending upon the character and position of the plantings as well as the ability of the soil to absorb the water; and to provide nozzles that are adapted to be removed and replaced with nozzles containing soluble fertilizer in tablet or rod form when it is desired to fertilize the plantings.

In accomplishing these and other objects of the invention as hereinafter pointed out I have provided an improved apparatus the preferred form of which is illustrated in the accompanying drawings wherein:

Fig. 1 is a perspective view of an irrigating apparatus constructed in accordance with the present invention.

Fig. 2 is a plan view of one of the outlet fittings showing the hose connections therewith.

Fig. 3 is a section through the outlet nozzle of the fitting with the section being taken on the line 3—3 of Fig. 2, and showing the nozzle adjusted to provide the maximum discharge rate.

Fig. 4 is a similar view but showing the nozzle adjusted to shut off the flow from the hose.

Fig. 5 is a cross section through the connector for the nozzle on the line 5—5 of Fig. 2.

Fig. 6 is a perspective view of the parts of the fittings shown in disassembled spaced relation to better illustrate the construction thereof.

Fig. 7 is an enlarged fragmentary section showing the relation of the orifices to regulate the rate of flow through the nozzle.

Fig. 8 is a longitudinal section through a modified form of nozzle which is adapted to contain fertilizer to be dissolved into the water flowing within the nozzle.

Referring more in detail to the drawings:

1 designates an irrigating apparatus constructed and assembled in accordance with the present invention for watering a plurality of plantings, such as trees 2, 3, 4 and 5 from a single water connection. The irrigating apparatus includes a plurality of sections of hose 6, 7, 8 and 9, the sections of hose may be of equal or different lengths, but each section is provided at one end with an externally threaded coupling member 10 and at the other end with an internally threaded member 11 whereby the sections of hose may be directly coupled together or connected by means of one of outlet fittings 12. The couplings 10 and 11 may be of any standard construction such as now used in coupling hose sections together.

Each outlet fitting 12 includes a tubular body 13 having external threads 14 at one end and an internally threaded socket 15 at the other to respectively engage the coupling members 11 and 10, when the outlet fittings are to be used in connecting the hose sections together. The tubular body portion of each outlet has a through-flow passageway 16, whereby the water may flow from one hose section to the next for supplying all of the outlets that are connected therewith.

Extending laterally from the body portion 13 of each fitting 12 is a tubular branch 17 having a flow passageway 18 therein connected with the flow passage 16 of the body portion. The branches 17 are also externally threaded as indicated at 19 to mount a nozzle 20. The nozzles 20, each have tubular body 21 terminating in one end in a laterally extending annular flange 22 and an integral diaphragm portion 23 that closes that end of the passageway 24 of the nozzle, the other end being open as at 25 for flow of water therefrom. The diaphragm portion 23 is provided with a relatively small orifice 26 that is offset from the axis of the nozzle to cooperate with a corresponding orifice 27 of a resilient washer 28 that serves as a seal between the nozzle and the threaded end of the branch 17. The washer 28 includes a disk portion 29 having a flat face side 30 for engaging the flat end 31 of the portion 23. Extending from the opposite face of the disk is a boss 32 preferably of elongated form and having flat sides 33 and 34 and rounding ends 35 and 36. The orifice 27 extends through the disk portion 29 and through the boss 32 and is in position to register with the orifice 26 in the nozzle when the nozzle is in position on the fitting. The terminal of the branch 17 is closed by a transverse diaphragm 37 that has an opening 38 therein conforming with the shape of the boss 32 so that when the disk portion of the washer is placed against the diaphragm 37, the boss enters the opening 38 to support the disk portion in coaxial relation with the closed end of the nozzle. With this arrangement, turning of the nozzle relatively to the body portion of the outlet fitting moves the orifice in the nozzle across the orifice in the washer to completely valve-off the flow therethrough or to regulate the flow in accordance with the amount required with the respective planting.

The nozzle is retained on the threaded end of the branch portion of the outlet fitting by means of a collar 39 having internal threads 40 for engaging the external threads 19 of the branch portion of the fitting and having an internally extending annular flange 41 encircling the nozzle 20 and engaging flange 22 when the collar 39 is moved into position to engage the threads 19 to draw the flat end 31 against the flat face side 30 of the washer and to retain the washer in seated relation with the closed end 37. With this arrangement the washer forms a leak-tight seal between the nozzle 20 and the branch portion of the outlet fitting but permits turning of the nozzle to control the relative positions of the orifices.

In order to indicate the relative positions of the orifices the nozzle 20 and branches 17 of the fittings are provided with markings 42 and 43 so that when the markings are in alignment the orifices 26 and 27 are in registry to provide the maximum flow from the body portion of the outlet units through the nozzle, and when the nozzle is turned so that the mark 42 thereon is at one or the other sides of the mark 43.

The form of nozzle shown in Fig. 8 is similar to the nozzles just described with the exception that the outer end of the nozzle is provided with external threads 44 for accommodating the internal threads 45 of a closure cap 46 and the lower portion of the nozzle is provided with a series of apertures 47. The nozzle thus forms a compartment 48 for containing one or more fertilizer cartridges 49 which may be in the form of highly compressed tablets or cylinders as shown in Fig. 8, otherwise the construction and operation is exactly the same as the other form of nozzle.

In using the invention, sections of hose 6, 7, 8 and 9 are connected in proper number and spacing to accommodate the outlet fittings to a plurality of plantings to be watered. The endmost outlet unit 50 (Fig. 1) is closed by a cap 51 that is threaded on the end thereof in place of a hose coupling member to retain pressure within the hose sections. The nozzles of the respective outlet fittings are adjusted by turning the nozzles within the coupling collars so that the orifices thereof provide the exact opening to give the required feed of water to the respective plantings. Or, if desired, any one of the outlets may be completely closed by turning the nozzle so that the orifices are moved out of registry with each other. The resilient washers not only provide a simple method of sealing the nozzles with respect to the branch portions of the fittings but they also provide a leak-tight seat for the ends of the nozzles so that the adjustments are at all times effective to give the desired flow rates.

If it is desired to fertilize one or more of the shrubs, the nozzle for that fitting is removed and replaced with the type of nozzle shown in Fig. 7. This is readily effected by disconnecting the open end nozzle by unscrewing the collar from the threaded portion of the outlet fitting after which a nozzle containing the fertilizer 49 and carrying a corresponding collar is applied to the end of the outlet fitting and tightened thereon, to provide a seal with respect to the washer, and yet maintain the looseness that is required in regulating the discharge rate of the water. The washer also provides friction that is necessary in obtaining an easy adjustment of the nozzle with respect to the fittings and to retain the nozzle in adjustment after adjustment has been made.

From the foregoing it is obvious that I have provided an irrigating apparatus that is especially adapted to the homeowner whereby he may simultaneously water a number of plantings and at the same time give each planting the amount of water required depending upon the size of the planting, character of the soil, or the slope thereof, so as to avoid any run-off and permit the water to be taken up by the soil.

What I claim and desire to secure by Letters Patent is:

1. An apparatus for simultaneously and selectively watering a plurality of plantings including a plurality of hose sections, each having a complementary coupling on the respective ends thereof for interconnecting said hose sections end to end to form a continuous duct with the coupling of one of the endmost hose sections being adapted to be connected with the source of water supply, and outlet fittings adapted to be interposed between said couplings of adjacent hose sections to discharge a portion of the water supply to the respective plantings, each outlet fitting including a tubular body forming a continuation of said hose sections and having complementary couplings on the ends thereof for connection with the couplings of the adjacent hose sections, a laterally extending tubular branch outlet connected with the tubular body and having a closed end extending transversely thereacross to form a substantially flat clamping face and having an opening therethrough substantially smaller than the inner cross section of said branch outlet so that the clamping face is of substantial area, a washer having fixed non-rotational support on said clamping face and provided with an opening therethrough radially off-set from the axis of the tubular branch and in registry with the opening in said closed end for discharging said portion of water through the outlet branch, a tubular nozzle having a closed end extending transversely thereacross and providing a clamping face cooperating with the first-named clamping face to engage and hold the washer therebetween over substantially the entire area of opposite faces of the washer, said closed end of the nozzle having an externally extending annular flange, a clamping collar having an internal flange encircling the nozzle for engaging the flange of said nozzle and having threaded connection with the outlet branch for drawing the clamping face on said nozzle into sealing contact with said opposite faces of the washer, said closed end of the nozzle having an off-set opening adapted to register with the opening in said closed end of the branch outlet when the nozzle is in one clamped position to discharge a portion of the water and to be turned out of registry when the collar is loosened and the nozzle is turned into another position where the washer sealingly closes the opening in the nozzle upon retightening of said collar.

2. An apparatus for simultaneously and selectively watering a plurality of plantings including a plurality of hose sections, each having a complementary coupling on the respective ends thereof for interconnecting said hose sections end to end to form a continuous duct with the coupling of one of the endmost hose sections being adapted to be connected with the source of water supply, and outlet fittings adapted to be interposed between said couplings of adjacent hose sections to discharge a portion of the water supply to the respective plantings, each outlet fitting including a tubular body forming a continuation of said hose sections and having complementary couplings on the ends thereof for connection with the couplings of the adjacent hose sections, a laterally extending tubular branch outlet connected with the tubular body and having a closed end extending transversely thereacross to form a substantially flat clamping face and having an elongated opening therethrough substantially smaller than the inner cross section of said branch outlet so that the clamping face is of substantial area, a washer having a lug on one face side engaging in said elongated opening for non-rotational support of said washer on said clamping face and provided with an opening therethrough radially off-set from the axis of the tubular branch and in registry with opening in said closed end for discharging said portion of water through the outlet branch, a tubular nozzle having a closed end extending transversely thereacross and providing a clamping face cooperating with the first-named clamping face to engage and hold the washer therebetween over substantially the entire area of the opposite faces of the washer, said closed end of the nozzle having an externally extending annular flange, a clamping collar having an internal flange encircling the nozzle for engaging the flange of said nozzle and having threaded connection with the outlet branch for drawing the clamping face on said nozzle into sealing contact with said opposite faces of the washer, said closed end of the nozzle having an off-set opening adapted to register with the opening in said closed end of the branch outlet when the nozzle is in one clamped position to discharge a portion of the water and to be turned out of registry when the collar is loosened and the nozzle turned into another position where the washer sealingly closes the opening in the washer upon retightening of said collar.

3. An apparatus as described in claim 1, wherein the nozzle forms a chamber for containing a fertilizer cartridge and having a removable cap closing the end thereof opposite said closed end of the nozzle, and wherein the nozzle has lateral openings spaced along the length thereof to discharge a fertilizer solution formed by contact of the water with the fertilizer cartridge.

References Cited in the file of this patent

UNITED STATES PATENTS

| | | |
|---|---|---|
| 26,994 | Hotz | Jan. 31, 1860 |
| 224,513 | Burdon | Feb. 17, 1880 |
| 1,848,948 | Grosser | Mar. 8, 1932 |
| 2,220,227 | Gifford | Nov. 5, 1940 |